(12) United States Patent
Crookham et al.

(10) Patent No.: US 9,363,441 B2
(45) Date of Patent: Jun. 7, 2016

(54) APPARATUS, SYSTEM AND METHOD FOR TRACKING SUBJECT WITH STILL OR VIDEO CAMERA

(71) Applicant: Musco Corporation, Oskaloosa, IA (US)

(72) Inventors: Joe P. Crookham, Oskaloosa, IA (US); Douglas L. Roorda, Pella, IA (US)

(73) Assignee: Musco Corporation, Oskaloosa, IA (US)

( * ) Notice: Subject to any disclaimer, the term of this patent is extended or adjusted under 35 U.S.C. 154(b) by 600 days.

(21) Appl. No.: 13/707,007

(22) Filed: Dec. 6, 2012

(65) Prior Publication Data

US 2013/0141588 A1   Jun. 6, 2013

Related U.S. Application Data

(60) Provisional application No. 61/567,476, filed on Dec. 6, 2011.

(51) Int. Cl.
| | |
|---|---|
| H04N 7/18 | (2006.01) |
| H04N 5/232 | (2006.01) |
| H04N 21/262 | (2011.01) |
| H04N 21/431 | (2011.01) |
| G06K 9/00 | (2006.01) |
| G06K 9/32 | (2006.01) |

(52) U.S. Cl.
CPC ........ *H04N 5/23296* (2013.01); *G06K 9/00342* (2013.01); *G06K 9/3216* (2013.01); *H04N 5/23216* (2013.01); *H04N 21/262* (2013.01); *H04N 21/431* (2013.01)

(58) Field of Classification Search
CPC .......... H04N 5/23203; H04N 5/23216; H04N 7/142; H04N 5/23296; H04N 21/431; H04N 21/262; G06L 2009/3225; G06L 2009/00342; G06L 2009/3216
USPC ...................... 348/14.03, 157, 141, 143, 155; 386/230, 248
See application file for complete search history.

(56) References Cited

U.S. PATENT DOCUMENTS

| | | | |
|---|---|---|---|
| 6,707,487 B1 * | 3/2004 | Aman ................ | A63B 24/0003 348/169 |
| 6,977,678 B1 | 12/2005 | Wada et al. | |
| 6,992,702 B1 | 1/2006 | Foote et al. | |
| 7,527,439 B1 | 5/2009 | Dumm | |
| 7,823,066 B1 * | 10/2010 | Kuramura .............. | G06Q 30/00 715/717 |
| 8,616,979 B1 * | 12/2013 | Daniel .................. | A63F 13/245 463/20 |

(Continued)

OTHER PUBLICATIONS

Adobe Photo Shop, Wacom Americas, <URL:http://www.wacom.com/en/In-Use/ForCreativeProfessionals/Applications . . . > [retrieved from the Internet: Nov. 1, 2011], 1 page.

(Continued)

*Primary Examiner* — Helen Shibru
(74) *Attorney, Agent, or Firm* — McKee, Voorhees & Sease, PLC

(57) ABSTRACT

An apparatus, method, and system for controlling camera aiming and operation through a convenient and intuitive interface using correlative touch and feel, which allows a camera operator to primarily pay attention to a game or event, while simultaneously controlling a still or video camera in three control dimensions, with a high degree of accuracy or quality.

10 Claims, 9 Drawing Sheets

(56) References Cited

U.S. PATENT DOCUMENTS

| | | | |
|---|---|---|---|
| 9,047,007 B2* | 6/2015 | Kodosky | G06F 3/041 |
| 9,124,562 B1* | 9/2015 | Currey | H04L 67/06 |
| 2002/0054216 A1 | 5/2002 | Kawashima | |
| 2005/0254200 A1 | 11/2005 | Matthews et al. | |
| 2007/0081726 A1 | 4/2007 | Westerman et al. | |
| 2007/0121011 A1* | 5/2007 | Relan | H04N 5/262 |
| | | | 348/571 |
| 2007/0171273 A1 | 7/2007 | Saleh et al. | |
| 2008/0165255 A1 | 7/2008 | Christie et al. | |
| 2008/0180404 A1 | 7/2008 | Han et al. | |
| 2008/0180405 A1 | 7/2008 | Han et al. | |
| 2008/0180406 A1 | 7/2008 | Han et al. | |
| 2008/0288092 A1 | 11/2008 | Matthews et al. | |
| 2009/0002344 A1 | 1/2009 | Wilson et al. | |
| 2010/0265340 A1 | 10/2010 | Masuda et al. | |
| 2011/0043496 A1 | 2/2011 | Ray Avalani | |
| 2011/0069019 A1 | 3/2011 | Carpendale et al. | |
| 2011/0085016 A1 | 4/2011 | Kristiansen et al. | |
| 2013/0191861 A1* | 7/2013 | Sasaki | H04N 21/236 |
| | | | 725/32 |

OTHER PUBLICATIONS

Axis Communications, AB, "Axis 295 Video Surveillance Joystick", Installation Guide, Rev. 1.0, Copyright 2006, Part No. 26393, 8 pages.

Axis Communications, AB, "Axis 295 Video Surveillance Joystick Datasheet", copyright 2008, 2 pages.

Axis Communications, AB, Axis Camera Station Datasheet, copyright 2011, 2 pages.

Axis Communications, AB, "IP-Surveillance Design Guide", copyright 2008, 50 pages.

Axis Communications, AB, "User Manual", Axis Camera Station, copyright 2004-2011, Ver. M2.7, Part No. 44738, 69 pages.

Bescor Company, "Bescor TH770 Tripod & MP101 Pan Head", <URL:http://www.bescor.com/Bescor_Tripod_MP101.htm> [retrieved from the Internet on Dec. 3, 2012].

Cintiq 21UX Pen Display, Wacom Americas [downloaded Nov. 1, 2011], <URL:http://www.wacom.com/en/Products/Cintiq/Cintiq21UX.aspx> [Retrieved from the Internet on Nov. 1, 2011], 2 pages.

Cintiq 24HD Touch Pen Display, Wacom Americas, <http://www.wacom.com/en/creative/products/pen-displays/cintiq/cintiq-24hd-touch> [retrieved from the Internet on Dec. 3, 2012], 22 pages.

C.R. Laurence "CRL Quik-Draw Mirror Cut-Out Templates/QD/" C.R. Laurence Company, <URL:http://www.technologylk.com/crl-quik-draw-mirror-cut-out-templates-lk . . . > [Retrieved from the Internet on Nov. 1, 2011], 2 pages.

Global Mapper User's Manual, Blue Markle Geographics, <URL:http://www.globalmapper.com/helpv7/Help_ToolsMenu.html> [retrieved from the Internet on Dec. 4, 2012], 9 pages.

Macadam, Charles C., "Understanding and Modeling the Human Driver", Vehicle System Dynamics, 2003, vol. 40, Nos. 1-3, pp. 101-134.

Powers, William T., "A brief introduction to Perceptual Control Theory", 2003, pp. 1-9.

Egeniq, "CameraControl for Axis", [retrieved from Internet on Sep. 1, 2011].

Lextech Labs, "iRa Pro", [retrieved from Internet on Sep. 1, 2011].

Our Home Spaces, "ip Camera Controller", [retrieved from Internet on Sep. 1, 2011].

Withings, "Smart Baby Monitor", http://store.apple.com/us/product/H7890ZM/A/smart-baby-monitor-by-withings?fnode=39&p=2#tech-specs, [retrieved from Internet on Dec. 4, 2012].

"Touch screen ptz control in Title/Summary", Podnova.com, iPhone Library, [retrieved from Internet on Sep. 1, 2011].

* cited by examiner

APPARATUS, SYSTEM AND METHOD FOR TRACKING SUBJECT WITH STILL OR VIDEO CAMERA

CROSS-REFERENCE TO RELATED APPLICATIONS

This application claims priority under 35 U.S.C. §119 to provisional application Ser. No. 61/567,476 filed Dec. 6, 2011, herein incorporated by reference in its entirety.

I. BACKGROUND OF THE INVENTION

Many people, who attend events such as sports games, concerts, weddings, etc., desire to both watch the event and photograph or video record the event for later enjoyment. Currently it is very difficult to do both. Either one will pay close attention to the camera and thus miss the enjoyment of the live event, or one will concentrate on the live event, with the result that the photographic record of the event is of poor quality. Though it is possible to simply set a still camera in a single location with, for example, a remote shutter release, or to place a video camera to record the entire sports playing area, the results of doing so are normally unsatisfactory. Also, for sports and other events, one particular player or performer may be of special interest to a spectator (e.g., parents watching their child playing basketball, performing on stage, etc.). But tracking a single individual back and forth down a basketball court or across a stage requires constant attention and detracts from the enjoyment of the event.

Servo control methods for operating still or video cameras are known in the art. For example, the "AXIS 295 Video Surveillance Joystick" commercially available from Axis Communications Inc. (100 Apollo Drive, Chelmsford, Mass. 01824) has a three-axis Hall-effect joystick, 12 programmable push-buttons and USB interface, and integrates with video surveillance software platforms recognizing joystick inputs via Microsoft's DirectX application programming interfaces from Microsoft Corporation, Redmond, Wash. (USA). An example of video surveillance software is "Axis Camera Station" software, commercially available from Axis Communications. Information about the AXIS 295 Video Joystick and AXIS Communications Software can be found at AXIS 295 Video Surveillance Joystick, Installation Guide© Axis communications AB2006, Rev. 1.0, Part No. 26393; AXIS Camera Station USERMANUAL©, 2004-211, Ver. M2.7, Part No. 44738; and (P-Surveillance Design Guide©, 2008; all from AXIS Communications, Inc., Chelmsford, Mass. (USA), and each incorporated by reference herein. Remote control pan and tilt units allow an operator to control many parameters of camera operation; however these units require the full attention of the operator to some kind of viewing screen that is either attached to or remote from the unit. The result is that the servo control systems are little different from a simply watching the event on screen or through a viewfinder while manually controlling a camera and do not allow for the user to enjoy watching the event 'live' instead of on a view screen. See also U.S. Pat. No. 6,977,678, incorporated by reference herein.

Therefore, there is need for a method, system, and apparatus for recording events and tracking subjects or persons which allows the camera operator to enjoy the event in real time. Specifically, there is a need for an apparatus, system, and method of kinesthetic control or "correlative touch and feel control" to control directional orientation of a still or video camera by methods that do not require constant or excessive watching of a viewfinder or video screen, and that allow intuitive manual control of camera aiming.

This correlative touch and feel control should take advantage of the body's ability to accurately do multiple tasks simultaneously, especially in the case where one task is a repetitive motor skill. In other words, using this ability, an observer can both watch an event and capture images without having to choose one or the other, and without significantly distracting either from the enjoyment of watching the event or from achieving high quality image capture.

Kinesthetic control, described herein as correlative touch and feel control is known as a means of control of mechanical equipment. For example, while the present document relies in general on common knowledge of the human ability to control mechanical systems, papers by William T. Powers "A Brief Introduction to Percepted Control Theory"© 2003; (see http://www.frontier.net/~powers_w/whatpct.html) and Charles C. MacAdam (see http://deepblue.lib.umich.edu/bitstream/2027.42/65021/1/MacAdam_2003%20VSD %20Understanding%20and%20Modelling%20the%20Driver.pdf, and Vehicles System dynamics, 2003, vol. 40, Nos. 1-3, pp. 101-134, Swets & Zeitlinger, incorporated by reference herein) provide an introduction to the theoretical basis for human control mechanical systems. Kinesthetic control is defined here as using finger, hand, arm, or other body movement in conjunction with a learnable physical and spatial interface, to control, direct, or influence a physical result. The control motions may correspond directly to a desired outcome (such as an individual piano key playing one note, or a computer key typing a single letter); may provide a signal that changes an object's position (such as the hydraulic control lever on a backhoe or excavator); or it may control the speed or other variable parameter of an object (such as the accelerator pedal on a car changing the car's speed). In these cases, after a period of learning, the body adapts to touch and feel control which provides either an absolute or relative reference to the desired output by either providing a one-to-one input/response sequence (e.g. the piano key), by making a change to the current state of the parameter being controlled (e.g. the hydraulic lever or accelerator pedal), or by making some other specific output response to a given physical input.

Using correlative touch and feel to control equipment is known in many fields other than photography. For example, an automobile relies on the use of a "correlative touch and feel" interface which requires an initial learning period, but which can then be operated very naturally with little singular focus given to the psycho-motor skills which are necessary. At first, learning to drive an automobile requires intense concentration. The learner must grasp the relationships of the motion of controls (the steering wheel, accelerator, clutch and brake pedals, gearshift, etc.) to the actual movement of the vehicle. And though the learner may control the vehicle very poorly at first, he or she soon reaches a level of mastery that allows the vehicle to be controlled almost entirely by correlative touch and feel. This control allows the driver to view and enjoy the scenery while maintaining smooth operation of the car. Control is maintained over different driving conditions such as city traffic, expressway speeds, curving and uneven country roads, etc., while the driver makes only occasional reference to the dash panel to glance at the speedometer and other instruments or to make sure of a control location.

Another example of this type of learned control of equipment is the operation of computer, ten key, and calculator keyboards. For example, while someone who is new to keyboard use may only be able to type a few words per minute, an experienced typist can input 50 to 100 words per minute with almost no conscious thought applied to the location of the keys, beyond initially feeling the reference marks typically found on the 'F' and 'J' keys. And what is mentally tiring at first—finding the keys in the order of words being scanned by eye—becomes second nature so that the fingers seem to respond almost independently of the eyes scanning a text that is being copied such that words and sentences instead of individual letters seem almost to flow from the keyboard.

Other examples of this type of learned control of equipment include flying airplanes; operating construction equipment such as a loader, backhoe, or excavator; controlling software operations (such as e.g. photo editing software) using computer input devices such as a mouse, pointer, touchpad, etc.; and playing musical instruments such as piano, accordion, xylophone, etc.

Control systems generally use a defined space to provide a general set of limits through which the manual control takes place, based on various types of sensory inputs. For example, a car has an operator station (seat) which positions the driver in a known physical relationship to foot controls (clutch, brake, accelerator), and to hand controls (steering wheel, gearshift, turn signals, wipers, radio, etc.). Within these bounds, through practice, the body quickly learns to provide inputs to the vehicle. The driver then interprets the movements of the car by observing several types of input. The view out the windshield is the most common input. Other inputs to the operator include the view in the rear-view mirrors, the position of a speedometer needle, presence or absence of indicator lights, the relative position of a turn-signal lever, road noise and vibration, and even things such as the memory of the physical location of an output—such as the memory of the manual gearshift position after an upshift from third to fourth gear.

These inputs are organized by the brain to provide a "sense" of the car's operation which includes but is not limited to the visual perception of the location of the vehicle. Often inputs provide redundant feedback which serves to either confirm a single input or to "flag" that input for verification. For example, the sense of acceleration provided by the driver being forced into the seat (or more accurately in real physical terms, the seat applying a force to the driver) and the sound of the engine (volume and timbre), along with knowledge of gear selected, road conditions, and previous speed allows a driver to very closely estimate vehicle speed, such that a visual scan of the speedometer may only be made when a speed limit sign or police cruiser is sighted. This results in smooth and skillful operation of the vehicle by an experienced driver devoting very little conscious attention to driving. In contrast, someone just learning to drive will try to visually scan the speedometer frequently but is much more likely to control vehicle speed quite unevenly. As a result of the body's ability to process and interpret many inputs, someone driving a car is typically aware only of making occasional visual reference to the vehicle speedometer to reassure and confirm correct operation, when in fact a great number of inputs are simultaneously being processed and evaluated.

Still further, the noteworthy adaptability of drivers to different vehicles shows how easily persons can "calibrate" their own sensory inputs to a varying control interfaces. To continue the vehicle analogy, the same person can easily move from a very small compact car with an automatic transmission and unresponsive acceleration, steering, and brakes, for example, to a highly responsive sports car having quick throttle, braking, and steering response, to an over-the-road semi-tractor having a thirteen speed manual transmission, and an operator seat (and therefore an operator visual reference point) higher than the roof of most cars.

While such operator control has been applied to some things, such as discussed above, it has not been applied to others. In the case of automobiles, backhoes, and the like, the operator kinesthetic control translates minute human motor control of a relatively few separate and dedicated controls (e.g., steering wheel, accelerator, brakes) into much more powerful mechanical forces and movements. In the case of musical instruments or computer keyboards, fine human motor control manipulates a larger number (e.g., standard piano has 88 keys, most computer keyboards have well over 50 keys) of separate one-function controls (e.g., one key for one note, one key for one letter) but to produce not mechanical power or movement, but some quite different output (e.g., sound energy or digital data that can be translated to letters or words). In these cases, the expense and complexity of the hardware for kinesthetic control and the value of its output is justified. However, those factors militate against kinesthetic control in other situations.

A need has been identified for improvements in the art of photographing or imaging a live event. Given a short time for learning, an operator of the system as described herein should be able to control a video or still camera, or even multiple cameras, with very little conscious thought given to the process and with highly satisfactory results, based on the body's ability to virtually automatically coordinate and assimilate multiple sensory inputs into a mental sense of the state of physical objects while performing other mental functions, particularly when the first function involves repetitive psychomotor skills.

II. SUMMARY OF THE INVENTION

Aspects of the invention as envisioned provide a method, system, and apparatus for controlling camera aiming and operation through a convenient and intuitive interface using correlative touch and feel, which allows a camera operator to primarily pay attention to a game or event, while simultaneously controlling a still or video camera in three control dimensions, with a high degree of accuracy or quality.

It is therefore a principle object, feature, advantage, or aspect of the present invention to improve over the state of the art and/or address problems, issues, or deficiencies in the art.

Aspects of the invention as envisioned can use a touchpad-type interface to provide two-dimensional 'X-Y' control with reference to a single plane (such as the horizontal plane of a basketball court, the vertical plane of action of a concert, wedding, or other event) for camera pan-tilt.

The touchpad may be an LCD screen or a tablet type computer such as an iPad®, with an interconnected camera, wherein certain locations on the touchpad correspond to given locations within an area such as a basketball court.

The touchpad may be mounted on a camera tripod at a convenient location to allow touchpad operation, or it may be hand-held or placed in the lap or on any available surface. A camera with electro-mechanical pan and tilt (PT) control can be mounted on a tripod or other suitable stable location. Interface cables are connected to typical connectors on the touch screen unit. The touchpad may include a display screen. The camera may also be mounted remotely and connected by a cable or wirelessly to other system components. A variable slide, trigger, or other input device can provide a third 'T' or "depth" control for camera zoom (other camera functions such as focus, f-stop, etc. could also be controlled using the same trigger or another mechanism). The 'Z' control may be separate from the touchpad, or may be attached to or made as a part of the touchpad.

Simultaneous enjoyment and imaging or recording of events is thus obtained. In one possible aspect of the invention, the combination of the two dimensional (2D) 'X-Y' correlative touch control with the 3rd dimension 'Z' trigger control can provide the heretofore unavailable ability to enjoy watching an event such as a game or concert even while simultaneously capturing still or video images, without losing the accuracy of three dimensional (3D) control of the imaging camera.

These and other objects, features, advantages, or aspects of the present invention will become more apparent with reference to the accompanying specification and claims.

III. BRIEF DESCRIPTION OF THE DRAWINGS

From time-to-time in this description reference will be taken to the drawings which are identified by figure number and are summarized below.

FIG. 1 illustrates one exemplary embodiment of a system of components according to aspects of the invention relative to an exemplary target (here a basketball court).

FIG. 2 illustrates, in enlarged sale, touchpad 20 of FIG. 1, and illustrates an exemplary input point 200 on touchpad 20 corresponding to a given camera view.

FIG. 3 illustrates an optional secondary camera 70 of FIG. 1 in enlarged scale.

FIG. 4 illustrates camera 50 and pan and tilt unit 60 of FIG. 1 in enlarged scale, and illustrates a camera view 205 corresponding to a given touchpad input.

FIGS. 5A-B illustrate a touchpad 20 of FIG. 1 in enlarged scale and an overlay 110 that may be used according to aspects of the invention.

IV. DETAILED DESCRIPTION OF EXEMPLARY EMBODIMENTS

A. Overview

Figure 1:
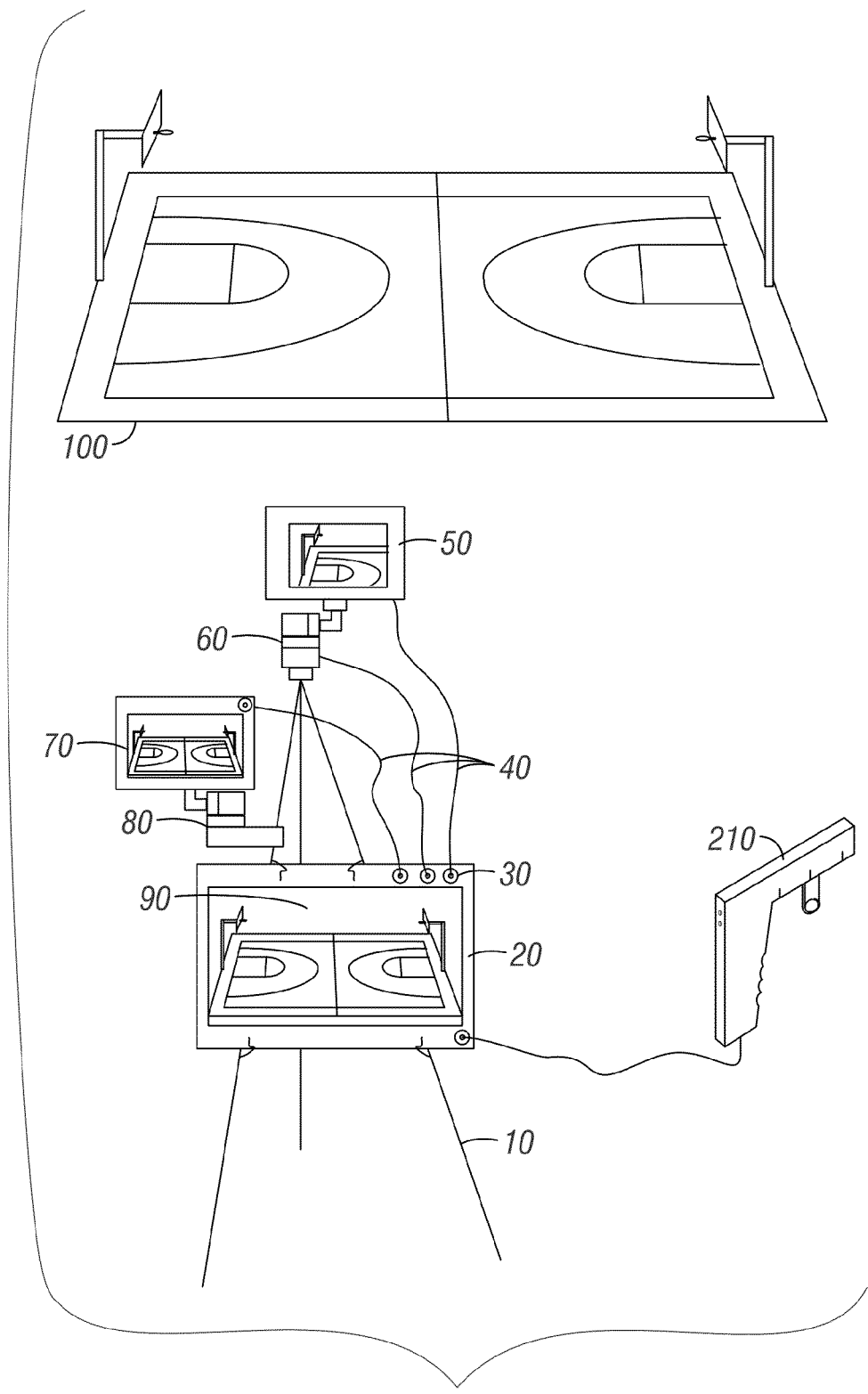

To further understanding of the present invention, specific exemplary embodiments according to the present invention will be described in detail. Frequent mention will be made in this description to the drawings. Reference numbers will be used to indicate certain parts in the drawings. The same reference numbers will be used to indicate the same parts throughout the drawings unless otherwise indicated.

Certain embodiments according to aspects of the invention as envisioned provide an apparatus, system and method for controlling camera aiming and operation through a convenient and intuitive interface using correlative touch and feel, which allows a camera operator to primarily pay attention to a game or event, while simultaneously controlling a still or video camera in three control dimensions, with a high degree of accuracy or quality.

B. Exemplary Method and Apparatus Embodiment 1

Figure 4:
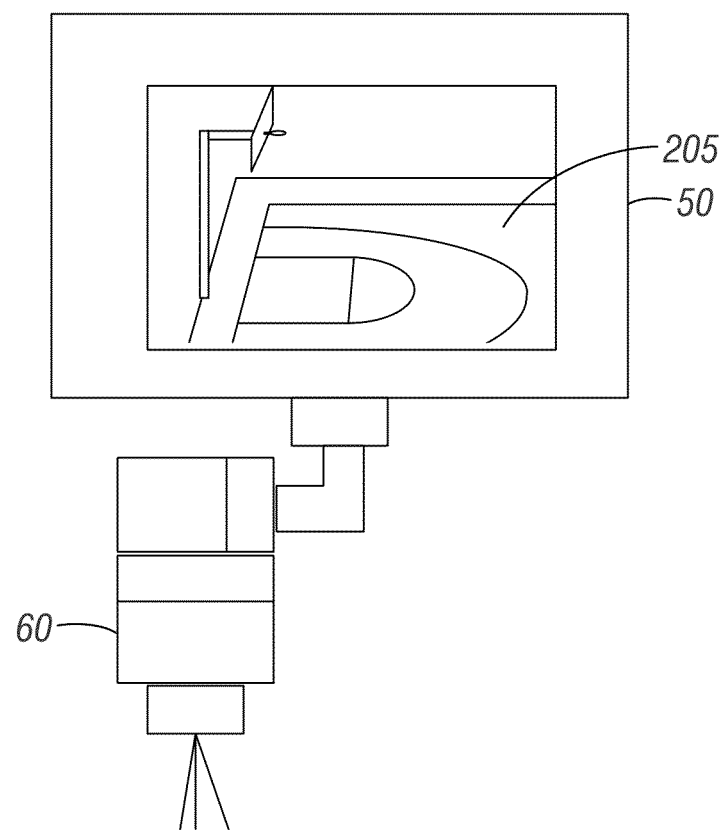

An embodiment according to aspects of the invention use a touchpad-type interface to provide two-dimensional 'X-Y' control with reference to a single plane (such as the horizontal plane of a basketball court, or the vertical plane of action of a concert, wedding, or other event) for camera pan-tilt. The touchpad may be of the type shown as item 20, FIG. 1, such as an LCD screen or a tablet type computer such as an iPad®, with an interconnected camera 50, FIG. 1 and FIG. 4, wherein certain locations on the touchpad correspond to given locations within an area such as a basketball court 100.

In one example, the basketball court displayed on touchpad 20 can be a rendering or graphically produced simulation of actual basketball court 100 of FIG. 1. It could be highly stylized or simplified to display certain commonalities with actual court 100, (e.g., basic proportional size but not absolutely required, landmarks such as outer court boundaries, half court line, free throw lines, positions of basket, and the like). In one example, the image of the court could be generic such that it could be reused for almost any basketball court. The concept would be that the rendering or simulated image of the court on the touch screen provides visual indication of the basic geometry and landmarks on a basketball court. Another possibility would be to provide an image of the actual court 100 on the touch screen display and have software that would allow the user to touch points around the boundary of the court as well as landmarks like mid line, free throw lines, and basket positions, and then the software would basically understand where on the screen space the different locations on the court are. It would be similar to putting in way points in a GPS system which would remember the points and their relative location to other points. In that way, a touch on the touch screen in operation would then know where the relative position of that touch on the touch screen would be to the image of the basketball court, which could then be correlated to the actual basketball court. For example, the Cintiq 21UX Pen Display monitor (commercially available from Wacom Americas, Vancouver Wash.) may be used with commercially available Adobe Photoshop® software (available from Adobe, San Jose, Calif., US) to provide this kind of interface. As can be appreciated from the foregoing, the basic concept is that what is displayed on the touch screen provides some visual representation of the event location (in this example a basketball court) such that significant characteristics like boundaries, and landmarks, can be discerned relative to the touching of a point on the screen such that all of the same can be correlated to the actual event location 100 (here basketball court 100).

The touchpad 20 may be mounted on a camera tripod 10 at a convenient location to allow touchpad operation, or it may be placed in the lap or on any available surface. Camera 50 with electro-mechanical pan and tilt (PT) control 60 is mounted on tripod 10 or other suitable stable location. One example of a commercial PT control is the Bescor MP-101 Motorized Pan Head, available from Bescor Video Accessories Ltd., 244 Route 109, Farmingdale, N.Y. 11735. See also U.S. Pat. No. 7,527,439, incorporated by reference herein.

Interface cables 40 are connected to typical connectors 30 on the touch screen unit. Touchpad may include screen 90, or screen 90 may be provided as a separate 'monitor' which is used to show the current camera view. In this case, the screen 90 might be attached to a seat back in front of the operator, with the touchpad 20 in the user's lap, while the camera 50 is mounted on a tripod at the end of the row, in a balcony, or other location which provides a good view while not obstructing other observers. Camera 50 may also be mounted remotely and connected by cable or wirelessly to other system components.

Figure 8:
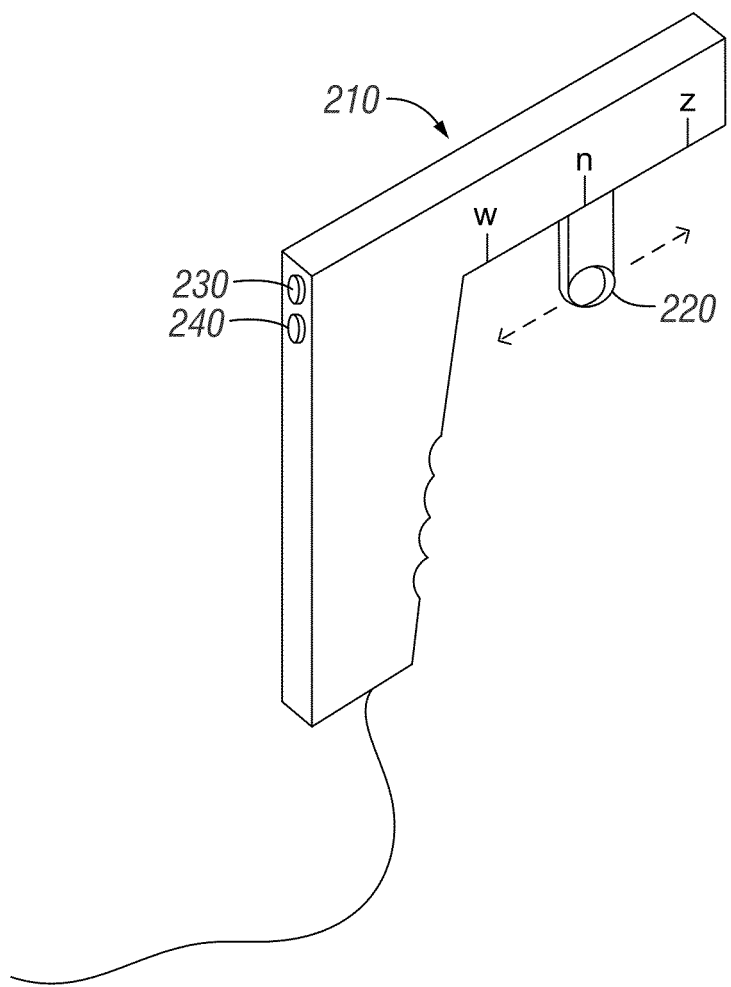
FIG. 8 illustrates an exemplary trigger control 210 of FIG. 1 in enlarged scale.

A variable slide, trigger, or other input device provides a third 'Z' or "depth" control for camera zoom. The trigger control may be of the general type shown as item 210, FIG. 1 and FIG. 8, and may be separate from the touchpad 20, or may be attached to or made as a part of the touchpad. Other camera functions such as focus, f-stop, etc. could also be controlled using the same trigger or another mechanism. As can be appreciated, as with many commercially available computer peripherals such as joy sticks, mouses, track balls, touchpads, wireless gyroscope/accelerometer based controllers as with commercially available Wii™ (systems available from Nintendo Co. Ltd., Kyoto, Japan; http://www.nintendo.com/?country=US&lang=en), the 'Z' or depth control could be a separate control device which is manually operated. With regard to integrating it on a touch screen or on another control (e.g., additional buttons or controllers on a joy stick or wireless controller), the designer could make such control easy to locate and access during operation.

A true innovation in simultaneous enjoyment and imaging or recording of events is thus obtained. Specifically, the combination of the 2D 'X-Y' touch control with the 3rd dimension 'Z' trigger control provides the heretofore unavailable ability to enjoy watching an event such as a game or concert even while simultaneously capturing still or video images (such as illustrated by the screen 205 in FIG. 4) without losing the accuracy of 3D control of the imaging camera.

Calibration

Figure 2:
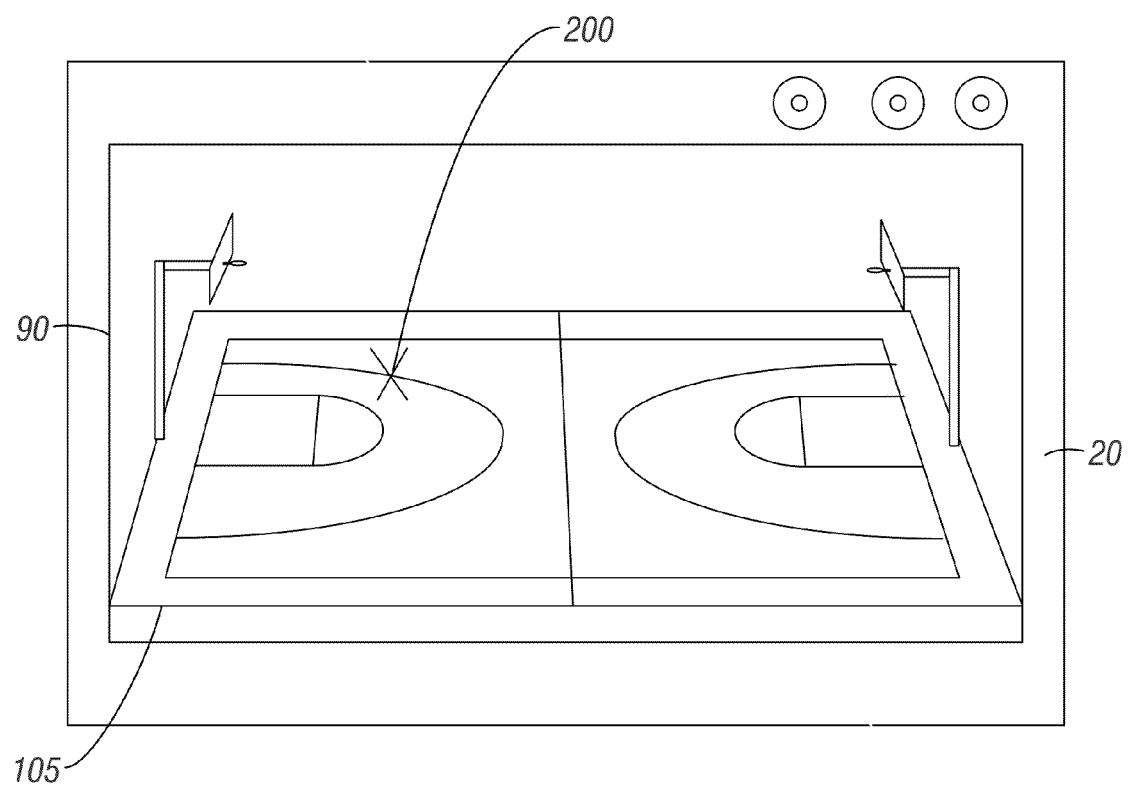
Figure 3:
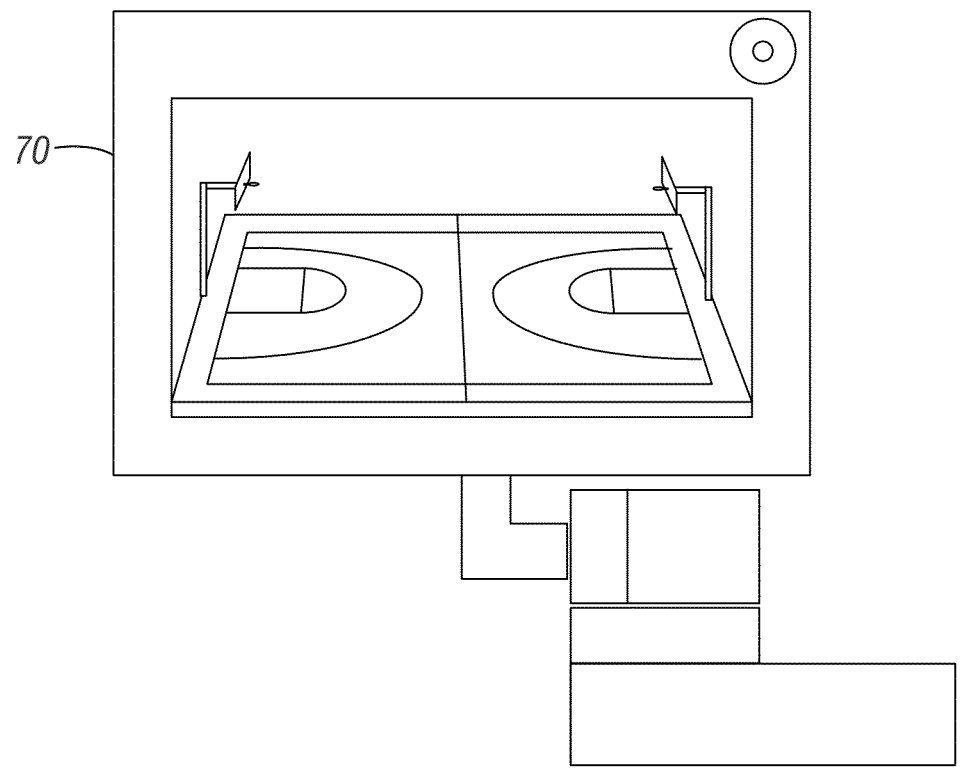

In one embodiment, for use, a calibration procedure is performed by the user, wherein the camera 50 view is correlated to the touch screen. During this procedure, an overall view or representation of the court 100 (e.g. 105, FIG. 2) is generated and displayed on the screen 90. (Depending on the specifications of the camera and the location of camera 50 relative to the venue, this overall view may simply be a single wide angle capture of the camera's viewing area, or it may be composed from multiple captures of smaller areas. Or a separate still or video camera 70, FIG. 1 and FIG. 3, could be used to provide the overall view.) Then the boundaries of desired viewing area, such as the corners of the playing court, are correlated to camera positions using a software procedure. (An example of such software is included below, see "Example of Camera positioning based on Touch Screen Input"). Again, an analogous example is the ability on a touch screen to place way points on a map such that the GPS/map system remembers the way points as well as their relative location to other points on the touch screen. For example, the camera is positioned and zoomed in accurately to the upper left corner of the court, and the user touches the corresponding corner of the touch screen. This is repeated for the other three corners of the court, then as many intermediate points (such as 200 of FIG. 2 as just one illustrative example) as are necessary may be selected and calibrated. These points might include both ends and the center of the half-court line, the center of each free-throw line, and two or more points on each three-point line. The final step might be the user tracking multiple points on touchpad 20 while verifying that camera 50 is accurately viewing the corresponding points on the court.

Alternatively, the view screen on camera 50 could be used to indicate camera positioning relative to user input, apart from the use of screen 90. The user could simply point camera 50 to a desired view and touch the touchpad 20 in order to calibrate camera 50 to the touchpad area 90. After calibration, the user would provide input to the touchpad and verify using the camera view screen that camera 50 was correctly following touchpad inputs.

Figure 9:
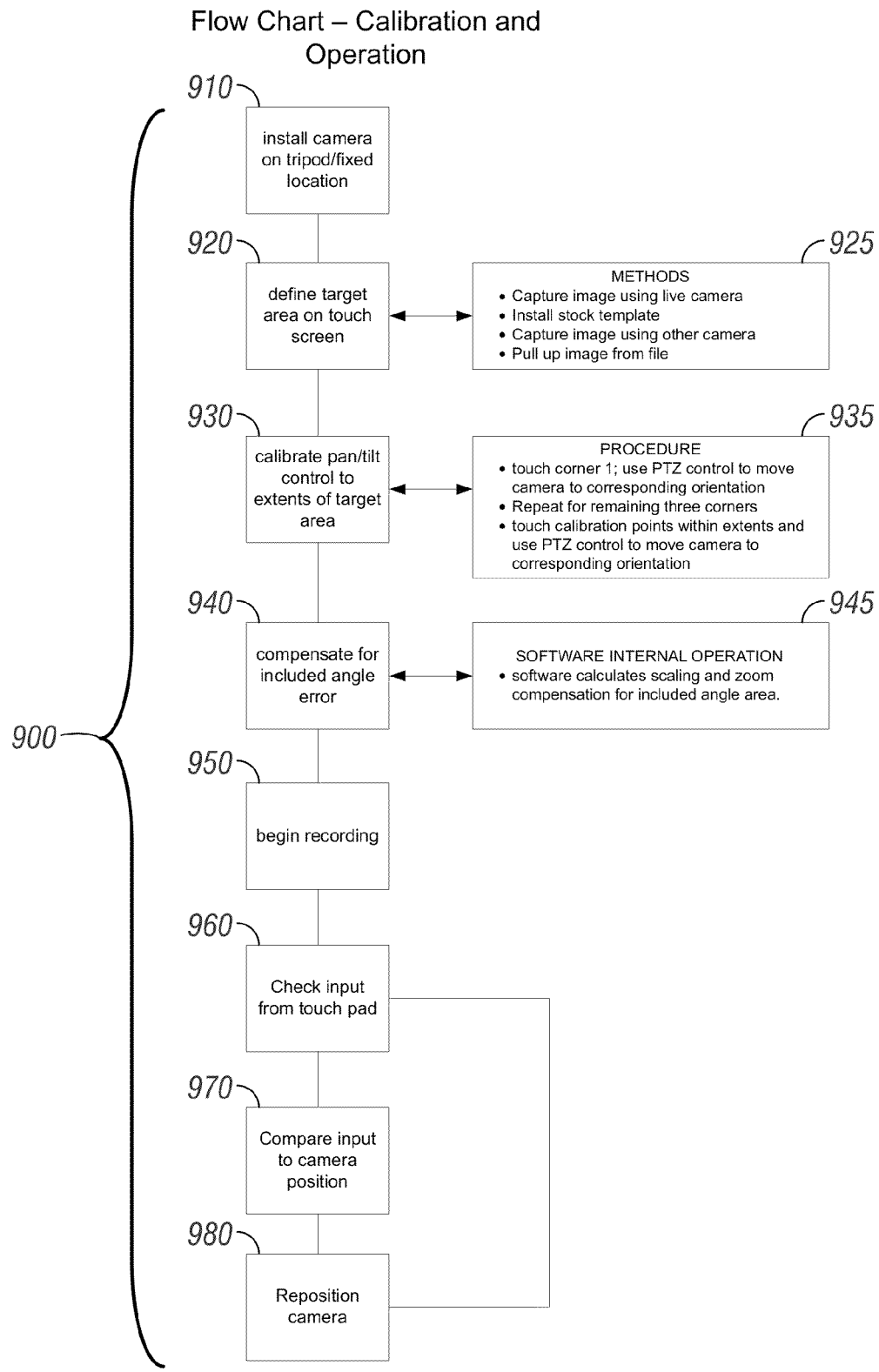
FIG. 9 is a flow chart of an exemplary calibration and operation method according to an exemplary embodiment of the present invention.

An exemplary specific calibration method is illustrated in FIG. 9.

Operation

After calibration, the user can initiate the 'record' mode on the camera and simply tracks the action on the court with finger movement on the touch screen. Controls to interface with the camera could be included in the touch screen interface and the trigger interface to allow the camera to be paused, to zoom in and out, or to control other camera features. During the game, the user may reference the screen as much as desired to verify the camera is tracking accurately, and might take the opportunity during any interruptions in play to adjust or correct the calibration.

The display on the touchpad, if used, might also display the actual area being viewed by the camera. "Grabbing" and "panning" the view in the display could be used to control the camera instead of "pointing" the camera to an area displayed on or represented by the touchpad. The concept of "grabbing" and "panning" is known in the art, see http://www.globalmapper.com/helpv7/Help_ToolsMenu.html, User's manual available at http://www.globalmapper.com/helpV12/Help-Main.html. Some users might find this interface easier to use. It would allow verification of the camera view and might be less susceptible to inadvertent movements of the camera tripod or mount. However it might require more frequent views of the touchpad in order to ensure that the camera is capturing the desired image, which could in turn lessen the perceived benefit of the device.

Control

Control of the camera PT unit 60 might be with a single finger tracing the action on touchpad 20. Based on programming and correlations between the virtual display of the event location on touchpad 20 and the actual event location relative to the actual camera 50, the finger tracing would be interpreted by the software into instructions that would geometrically be converted to change pan or tilt to change the aiming direction of the camera relative to the actual court 100. While this is a conversion of a two-dimensional finger trace on a two-dimensional surface into a court and camera in three-dimensional space, by calibration and programming, the correlations would generally be sufficient to move the camera field of view in the intended manner of the finger trace. In other words, the field of view of the camera would normally capture at least a substantial portion, as opposed to a small point, of the court. Thus, if the finger trace generally moves the aiming direction of the camera in the same intended way as the finger trace it should be sufficient to normally capture the intended field of view changes of the operator. The trigger 220 in FIG. 8 could be used to adjust camera zoom by pushing the trigger forward to zoom in and pulling the trigger out to zoom back. Of course, the zoom concept would be quite discretionary on the part of the operator. Such would not change the aiming direction of the camera but rather the magnification of the recorded image. This also normally does change the size of the field of view relative the actual court 100. The operator could glance at the camera display, if available, to double check field of view. Alternatively, the software might change the simulated field of view on the touch screen to approximate the level of zoom instructed to the camera to allow the operator to glance at that for context. Another example could be a screen within a screen on the touch screen that gives some feedback on field of view. Other possibilities are within the skill of those skilled in the art. The trigger 220 could provide feedback by trigger position, detents, engraved or embossed marks (such as e.g., "w", "n", "z" in FIG. 8, for wide angle/normal/zoom), etc. to provide a reference for one or more intermediate zoom levels. Also or alternatively, multiple or repeated finger movements on the touchpad (such as tapping or spreading two fingers apart for zoom in, or touch-and-hold, or pinching fingers together for zoom out) could be used. This type of touch screen manipulation is becoming ubiquitous with touch screens on Smart Phones, iPads, and the like. Combinations of control inputs could be used as well, such as separate buttons for full zoom in, full zoom out, and 'normal' modes and/or trigger use for infinite variation between extremes. Thus, in one embodiment, one hand would control camera pan and tilt through the touchpad, and the other would control camera zoom through the trigger. Alternatively, the trigger, a knob, slider or other control could be attached to or integrated with the touchpad to allow one-handed operation. The trigger might be integrated into a handle or grip that would allow one hand to comfortable hold the touchpad and control camera zoom with the other hand free to operate pan and zoom. Button 230, FIG. 8, on trigger controller 210 could be used to trigger a still camera image or to start recording; button 240 could display the still image or to stop recording. Other functions/buttons are, of course, possible.

The "z" or "zoom" control could be separately controlled by a separate subsystem. For example, some cameras have wireless remote controls that can control zoom.

Interactive, non-visual feedback might be provided from the touch screen to the user. Certain areas on the screen could be programmed to provide tactile feedback. For example, the user touching any area of the screen that corresponds to an 'out of bounds' area could trigger a continuous vibration from the touch screen or its housing. Or pre-designated spots could give feedback to the user—perhaps varying intensity, duration, and intervals of vibrations to indicate center court, near and far boundary lines, etc. One long vibration could indicate the center point of the court. Two short vibrations could indicate center point of the left free throw line; two long vibrations could indicate center point of the right free throw line, etc. Zoom levels could be preset (within the bounds of camera capabilities) if the operator desired to limit zoom-in or zoom-out capability. Feedback from a hand-held touch screen based device or the like in the form of vibration, sound, visual signals (e.g., LED on/off or flashes) are well-known and ubiquitous with regard to hand-held devices, particularly with gaming applications or vibrating Smart Phones.

Just as with other learned skills, intentional reference will normally be made by the operator to verify results, depending on the quality desired and the skill and aptitude of the operator. An operator would be expected to carefully explore operation during set-up by looking at the screen and practicing camera control. The operator would also be expected to glance at the screen from time to time during operation. Further verification of results would be obtained by replaying the still or video images; there could be immediate benefit to replay during time-outs, between periods, etc. The operator would also be able to benefit from later playback, similar to how conventional photography and videography is evaluated in post-action playback. Although the results of a recording session might be considered acceptable, the operator could still notice and correct their technique for x-y (location) and z (zoom) control, for example.

C. Options and Alternatives

The invention may take many forms and embodiments. The foregoing examples are but a few of those. To give some sense of some options and alternatives, a few examples or additional discussion are given below.

The touchpad could be separate from the screen. A dot, cursor, or highlighted area could be displayed on a separate screen indicating the tracking position of the camera. Other input devices could be used such as a joystick, game controller, 3D mouse, etc. Feedback (e.g. vibration) could also be applied to these alternate controllers.

Many other input alternatives would be possible. For example, a ten key style pad could be used, where the camera would be calibrated to focus on one of nine separate zones upon command. The user could press a single key to indicate which zone the camera should focus on. Additionally, "+" and "−" keys could be used to control camera zoom. The "Enter" key could return the camera to a preset wide-angle view of the entire area.

The touch interface could be fitted with a custom guide plate or template, shaped like a typical court or field. The template could have reference features that would be easily identified by touch which correspond to locations on the court. In order to have such an overlay or template, touch screen operation would have to be retained. This could be, for example, a transparency or translucent sheet over the touch screen that retains the underlying touch screen function of recognizing placement of a finger or pressure at a point on the touch screen. An example of similar overlays is the collection of "CRL Quick-Draw Mirror Cut-out Templates" commercially available from TechnologyLK (http://www/tecjmp; pgu;l/cp,). This could improve the accuracy of the correlative touch and feel interface, by helping the user to control hand/finger movement with reference to the screen but without having to look at the screen. This template could be as simple as a raised edge around the touch screen, or it could provide a detailed tactile model of the court, for example the markings on a basketball court might be overlaid on the screen (e.g., with embossments) so that the user could feel by just finger-touch and trace around the 3-point line or the free throw line as the player of interest is moving on the court. Additional tactile reference points could be provided either at the edges of the screen or across the screen as desired.

Multiple templates for different sports and events might be provided, a single template could be used, or the physical shape and feel of the touchpad could provide sufficient tactile and spatial feedback to easily control the camera.

Camera controls could include a separate or integrated remote function, such as a trigger or button (e.g. 230, FIG. 8) to initiate recording. Multiple inputs could control camera functions. The remote could be connected directly to the camera, or could be connected indirectly through the touchpad or controller.

Customized Input Screen Example

Figure 5A:
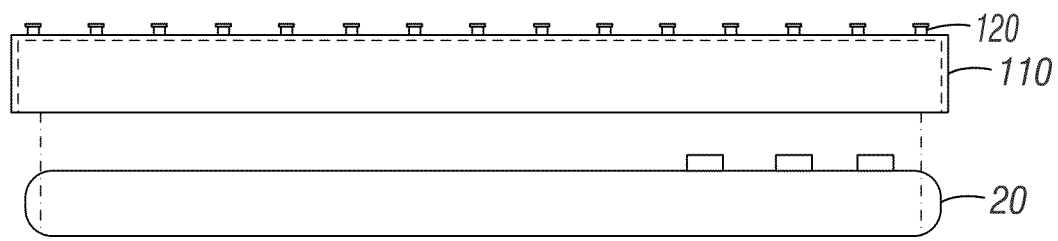
Figure 5B:
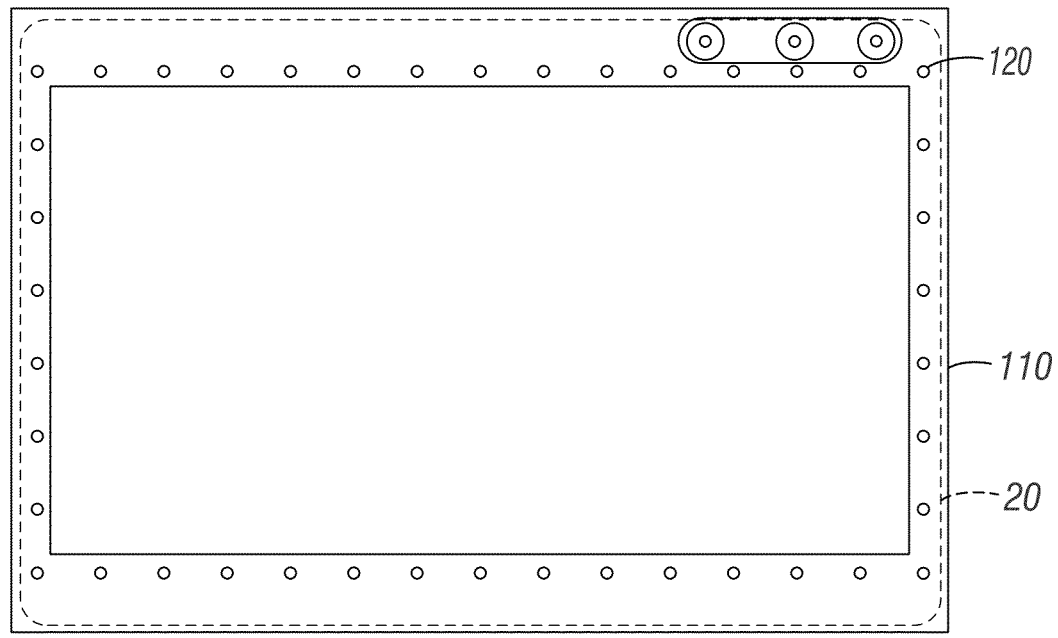
Figure 6:
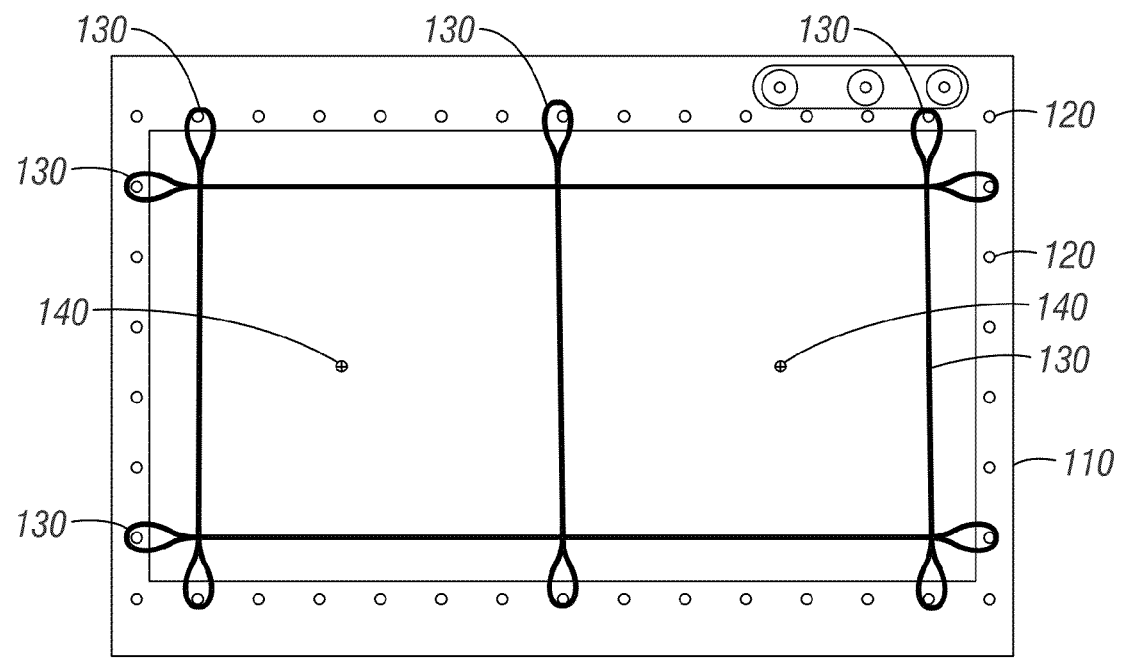
FIG. 6 illustrates positional reference helps which are used with overlay 110 and touchpad 20.
Figure 7:
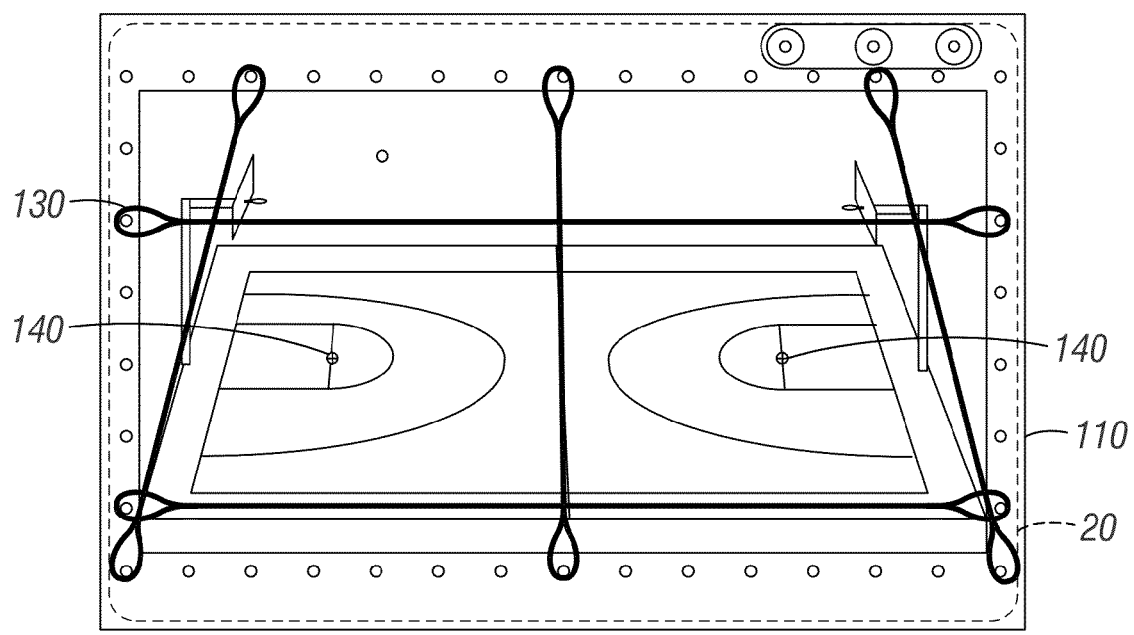
FIG. 7 illustrates overlay 110 in use on touchpad 20.

One example of a customized guided system is shown in FIGS. 5A-B and 6. The screen is fitted with a surrounding overlay 110, FIG. 5A, which installs over touchpad 20; shown in side view. FIG. 5B shows overlay 110 fitted to touchpad 20. Overlay 110 is fitted with studs 120. Elastic loops 130, FIG. 6, can be hooked over studs 120. Additionally, moveable markers 140 (e.g., small but tactilely discernable members), which are designed to cling (e.g., electrostatically or releasable adhesive) to the touchpad screen can be placed on the touchpad 20. In FIG. 7, loops 130 are shown fastened in a pattern that approximates zones in the basketball court which is displayed on the touchpad 20 (the ability to align the cord between loops on selective studs 120 allows camera angle perspectives to be approximated for target boundaries). Additionally, moveable markers 140 have been placed to mark the center of the free throw line on each end of the court. Given the elastic bands marking the edges of each half of the court and the markers at reference points within each court half, the user can easily approximate finger position on the touchpad with very little need to look at the touchpad during play. This allows accurate control of the camera without detracting from the experience of watching the game. In other words, the user knows each half of court 100 is bounded by elastic cord material having looped ends 130, and the user knows each free throw line has a small marker 140. Without having to look at pad 20, the user can tactilely feel the boundaries of either half of the court and touch screen 90 within that half to aim camera 50 there. If aim at or near the free throw line is desired, the button 140 in that rectangle is located and the touchpad 20 touched there.

Other customized guided systems that provided a tactile reference that could be correlated to positions on a field or other target or camera space could easily be created, as long as a way of tactilely identifying hand or finger position in relation to the input device is provided.

Uses

A version of the exemplary video camera system might be used for various indoor and outdoor sports such as basketball, volleyball, football, track and field, etc. It could also be used for public events such as concerts, weddings, plays, and so forth. Multiple screen overlays could be developed for different sports or field types to provide ease in adjusting to a given use. In any case, just as an experienced driver may switch vehicles with a quick glance at the controls, an experienced operator of this system might find the calibration procedure to be very quick and the operation to be almost without conscious thought. The result would be the highly desirable ability to watch and enjoy sporting events, concerts, etc., while keeping a video record of the event for later enjoyment.

Use of the system could be expanded from consumer use to institutional and professional use. Coaching staff could record practice or game action using one or more cameras while or in addition to performing other tasks. (Cameras could be mounted permanently for these uses.) Local TV stations could control multiple cameras with only one operator. Large scale broadcasting operations could enhance camera coverage; for example a commentator/co-anchor could have one or more cameras under his or her control in addition to the cameras controlled by the director. Olympic type events that do not merit a full camera crew could be covered by one person with one or more cameras under control, allowing greatly expanded video footage at very little cost. Churches or organizations wishing to broadcast services or events but having limited staff could assign a sound-board operator to control one or more cameras instead of needing a dedicated operator. A movie director or staff could control one or more cameras.

Remote Use

Many occasions exist when it would be convenient for a viewer to control a camera at a location which is remote from the event to be recorded. For instance, relatives or team supporters who are unable to personally attend a game or event might still wish to watch and record the actions of a child, grandchild, or other favorite player. Likewise, those unable to travel with a high school or college basketball team might want to record footage of a player or team from a remote location.

Remote use of a camera as discussed above might be enabled simply by mounting a camera to a tripod or fixture in a sports venue and connecting via internet to touchpad and trigger controls at any location with internet access. A primary example is the increasing popularity of web-casting college sports. Even mid-major or small universities or colleges promote live video coverage of multiple sports events for fans such as parents that cannot attend. Many times resources (staff and equipment) result in a single static camera view of the whole court, or imprecise and burdensome manual pan/tilt/zoom by an inexperienced operator. The present invention could allow better presentation of the event, even by inexperienced operators. Additionally, it might make feasible multiple cameras for different coverage and viewing angles.

D. Additional Options and Alternatives

Many options and alternatives are envisioned. For instance, a still camera could be used instead of a video camera. Multiple cameras in different locations could be interfaced to the computer or processor and calibrated to the touchpad, to provide multiple views of the action. Multiple cameras recording with different formats, or settings, could be recording from the same location (one camera with a wider angle setting for instance, in case the action is too quick to follow, etc.). Cameras could be mounted above the court and controlled by touch. Cameras could be switched in and out by zones, so that the closest available camera was always in use.

The calibration procedure is described above in terms of camera having an elevated view of a horizontal playing court such that the corners of the court are easily identified. However, for a camera located near the level of the court, the calibration would be oriented mostly towards left and right pan, with the overall screen image being a side view of the venue. In this case, calibration would primarily reference the amount of left and right pan of the camera and secondarily tilt up or down. This would be the case for many events such as concerts or weddings where the touch control would mostly be used for pan control of the camera.

Additional Notes

A separate camera in addition to the PT controlled camera could be used to provide a full screen view. Or a single camera could be used such that the view on the screen would represent the view being recorded by the camera. A non-visual touchpad could be used, most likely held in the lap, with a separate screen positioned on the camera tripod for viewing. Multiple displays or display areas could show the full court area for the touchpad interface as well as the view from the PT-controlled camera. A split-screen view on a single screen could display camera space of plural cameras.

A sports venue or other concern could also provide video feeds which the touchpad interface or other interface could control or access, either in real time or as a time-delayed or even post-game feed, to provide a customized video experience. The venue could rent or provide controls to an in-house system, or provide interfaces to user-supplied recording equipment. Or user-owned equipment could be interfaced with an in-house system. For example, an iPad could connect by cable or wirelessly with the building system which provides a video feed to the iPad. The user would manipulate cameras built into the building by touch interface with the iPad which would relay the command to the building-based system.

The system could be combined with a system using markers, transponders, or even face or number recognition (e.g. to track player jersey number) for camera control/subject tracking. In the case of automated subject (e.g., player) tracking there would be certain periods during the game when the subject (e.g., player) might not be in play but game action continued. Use of this invention in that case would make it possible to continue recording the action.

Example of Camera Positioning Based on Touch Screen Input

In order to effect pan and tilt control of a camera in the manners described above, a touch screen may be used as in input device, with specific areas on the touch screen assigned to a camera position. Persons having skill in computer servo control or computer numeric control (CNC) should easily be able to make this interface. One possible way to provide this correlation is explained below.

First, the screen is divided into discrete areas. For instance, a touch screen measuring 8 inches by 10 inches could be divided into 20 one-inch squares, identified by row indicators (numbers 1-4) and column indicators (letters A-E). The upper left corner of the screen would be designated as "A1" and the lower right corner of the screen would be designated as "E4."

A pan-tilt camera control using stepper motors could then be calibrated to point to the appropriate physical location based on input from the touch screen, as well as to provide feedback to control software of the actual camera position. For example, a camera could use two separate stepper motors which provide fine control of camera tilt and zoom. Such a camera could have a home setting designated as X0/Y0. A command to move (pan) the camera right or left would simply be a positive or negative X value. So if the camera could pan right or left 90°, the command "X−90" would move the camera 90° to the left; "X+90" would pan the camera 90° to the right. Likewise for vertical control, if the camera had a range of +/−20° from horizontal, a command "Y−20" would tilt the camera down 20°; a command "Y+20" would tilt the camera up 20°. Commands for position control could range from "X−90/Y−20" (90° left, 20° down) to "X+90/Y+20" (90° right, 20° up) as one example. Addition, the coordinates for the camera position could be queried by control software, so that for instance the user could use a joystick control, etc. to adjust pan/tile of the camera to a desired orientation, whereupon the software would report an X/Y coordinate to the software.

For use, the camera could be positioned by clamping to a fixed location such as a tripod or balcony railing. A "zero" function would calibrate the camera position to its location. Then the user would pan and tilt the camera to the show its farthest extents in each direction and to correlate those extents to the corners of the screen. These extents might be as follows:

| Touchpad corners | Camera farthest extent 'X' coordinate | Camera farthest extent 'Y' coordinate |
| --- | --- | --- |
| A1 | X-30 | Y0 |
| E1 | X-10 | Y0 |
| A4 | X-30 | Y-15 |
| E4 | X-10 | Y-15 |

Then the software would divide the coordinates by the number of available positions on the touch screen so that the camera would move evenly within the predefined extents. The resulting correlated coordinates might be as follows, with "I" representing "touch pad control Input" and X and Y representing desired camera positioning coordinates):

| I | X | Y |
| --- | --- | --- |
| A1 | −30 | 0 |
| A2 | −30 | −5 |
| A3 | −30 | −10 |
| A4 | −30 | −15 |
| B1 | −25 | 0 |
| B2 | −25 | −5 |
| B3 | −25 | −10 |
| B4 | −25 | −15 |
| C1 | −20 | 0 |
| C2 | −20 | −5 |
| C3 | −20 | −10 |
| C4 | −20 | −15 |
| D1 | −15 | 0 |
| D2 | −15 | −5 |
| D3 | −15 | −10 |
| D4 | −15 | −15 |
| E1 | −10 | 0 |
| E2 | −10 | −5 |
| E3 | −10 | −10 |
| E4 | −10 | −15 |

The result would be that after the calibration procedure, when the user touches the upper left corner area "A1", of the touch screen, the software would direct the camera to move to X−30/Y 0; when the user touches the area "C3" near the center, the software would direct the camera to move to X−20/Y−10.

The above example could be refined in several ways. For instance, the screen could be subdivided into much smaller areas; for example the horizontal range might be from zero to 255 and the vertical range into 56 or more, providing 256 individual 'X' positions and 56 individual 'Y' positions. A correction factor for distance (which would compensate for a larger physical area being encompassed by a given degree movement of the camera when the object is more distant) could be introduced, either by a software calculation or by manual correction. Further calibration methods are possible, such as a pixel-by-pixel correlation of the display screen and touchpad interface sensors to a PT position reference using one or more identified pixels from the camera. For pixel-by-pixel correlation, the extents of the target area would be identified as above, then each individual pixel or finest division of the touch screen could be assigned a specific X/Y coordinate for the camera.

Example of Calibration Procedure

FIG. 9 illustrates an exemplary calibration procedure 900. Blocks correspond to general procedures or steps. First, FIG. 9, step 910, a camera is installed in a fixed location such as on a tripod or attached to the building structure. Second, step 920, by one of several means, the target area is defined on the touch screen. This can include (925) capturing the entire target area as an image, installing an existing template on the touchpad, capturing the target area using another camera, using an already existing image, etc. Third (930), the pan/tilt (and possibly zoom) controls are calibrated to the extents of the target area. (This can be done (935) by touching the upper left corner of the touch pad, then using the pan/tilt/zoom controls to move the camera to the corresponding orientation, so that when the screen is touched in the corner during operation, the camera will move to view/record that area.) The procedure is repeated for the remaining three corners. Then a sufficient number of points within the target area are similarly addressed. Next (940) the system is compensated for "included angle area" (when the camera moves a specified number of steps or degrees, the amount of area on the target area that is swept will vary, depending on factors (945) that include the distance of the camera from the given portion of the target area.) This calibration can adjust so that camera movements are smooth over the entire target area; also zoom levels might be adjusted for nearer and farther areas of the target area so that (for example) a player is displayed at the same relative screen size regardless of his or her position on the court.

Once the camera system has been calibrated, the user can begin recording (950). At this point, the basic function of the system is to check for input (960) from the touchpad. Information from the camera positioning system is read by the system controller and compared (970) to the desired position. The camera aim is then adjusted (980) to provide the desired image requested by step 960. This process continually repeats during operation.

Of course other normal camera functions will be functioning simultaneously, and many other refinements as discussed above are anticipated.

The invention claimed is:

1. A method for a spectator to record by photograph or video a moving person or object in a live event at substantially any sports event location while being able to watch substantially continuously the moving person or object and/or event comprising:
a. positioning a camera (still or video) relative to the event location so that its aiming direction is generally towards the event location and its field of view can capture at least a substantial portion of the event location;
b. positioning the spectator to have a direct view of the event location with a control device having a display for presenting the camera field of view to the spectator and a user-actuated control for indicating any position on the display; and
c. communicating change of aiming direction, zoom, or field of view instructions to the camera via correlative touch and feel control of the control device by the spectator which:
   i. does not materially disrupt or obstruct the spectator's view of the event; and
   ii. tracks live movement of an individual sports player moving in the event location by the spectator operating the control to generally indicate on the display relative position or direction of movement of the moving person or object in the event location and bases the instructions of such tracking;
d. so that the spectator can substantially continuously view the live event with only occasional visual reference to the control device.

2. The method of claim 1 wherein the control for the correlative touch and feel control comprises one or more of:
a. a touch screen;
b. a joystick; and
c. a hand held control with levers and/or buttons.

3. The method of claim 2 wherein the camera includes mechanized pan, tilt, and zoom capabilities.

4. The method of claim 3 wherein the control is correlated to the mechanized pan, tilt, and zoom capabilities of the camera so that manual operation of the control produces a correlated change on pan, tilt, or zoom of the camera.

5. The method of claim 1 wherein the camera comprises a still or video camera or both.

6. The method of claim 1 further comprising providing sensory feedback to the spectator relative to a change or aiming direction, zoom, or field of view instruction.

7. The method of claim 6 wherein the sensory feedback can be associated with at least one of:
a. a particular aiming direction;
b. a particular zoom setting;
c. a particular point in the field of field;
d. a boundary in the field of view;
e. a particular point of the event location; and
f. a particular boundary of the event location.

8. The method of claim 7 wherein the sensory feedback can differ for different associations.

9. The method of claim 6 wherein the sensory feedback can be:
a. tactile;
b. audible;
c. visual; or
d. combinations of any of the above.

10. The method of claim 1 further comprising:
a. designating a virtual boundary associated with the control device which limits how far the instructions can change aiming direction, zoom, or field of view of the camera for an event location;
b. the virtual boundary correlated to an actual boundary of the event location.

* * * * *